United States Patent [19]
Kawanaka

[11] Patent Number: 6,138,145
[45] Date of Patent: Oct. 24, 2000

[54] METHOD OF ELECTRONIC DIALOG BETWEEN COMPUTERS, COMPUTER FOR ELECTRONIC DIALOG WITH COUNTERPART COMPUTER, AND STORAGE MEDIUM STORING ELECTRONIC DIALOG PROGRAM EXECUTABLE BY COMPUTER

[75] Inventor: Kenichi Kawanaka, Tokyo, Japan

[73] Assignee: NEC Corporation, Tokyo, Japan

[21] Appl. No.: 09/103,719

[22] Filed: Jun. 24, 1998

[30] Foreign Application Priority Data

Jun. 25, 1997 [JP] Japan ................................. 9-168833

[51] Int. Cl.$^7$ ............................ G06F 13/38; G06F 15/17
[52] U.S. Cl. ...................... 709/204; 709/203; 709/205; 345/330; 370/200; 707/201
[58] Field of Search ................................... 709/204, 208, 709/203, 220, 223, 228; 706/49, 60, 61; 707/201; 348/7, 8, 12, 18, 46, 564; 395/701, 712, 750.01, 500, 527, 651, 726; 345/330, 335

[56] References Cited

U.S. PATENT DOCUMENTS

| | | | |
|---|---|---|---|
| 5,358,259 | 10/1994 | Best ........................................ | 273/433 |
| 5,806,060 | 9/1998 | Borgida et al. ............................... | 707/3 |
| 5,812,126 | 9/1998 | Richardson et al. ..................... | 345/330 |
| 5,828,839 | 10/1998 | Moncreiff ................................. | 709/204 |
| 5,852,435 | 12/1998 | Vigneaux et al. ....................... | 345/302 |
| 5,879,163 | 3/1999 | Brown et al. ............................ | 434/236 |
| 5,880,731 | 3/1999 | Liles et al. ............................... | 345/349 |
| 5,894,305 | 4/1999 | Needham ................................. | 345/329 |
| 5,918,010 | 6/1999 | Appleman et al. ...................... | 709/203 |
| 5,956,491 | 9/1999 | Marks ....................................... | 709/250 |
| 5,960,173 | 9/1999 | Tang et al. ............................... | 709/201 |
| 5,963,217 | 10/1999 | Grayson et al. ......................... | 345/473 |
| 5,974,446 | 10/1999 | Sonnenreich et al. .................. | 709/204 |
| 5,997,476 | 12/1999 | Brown ...................................... | 600/300 |
| 6,002,402 | 12/1999 | Schacher ................................. | 345/352 |
| 6,006,260 | 12/1999 | Barrick, Jr. et al. ..................... | 709/224 |
| 6,011,537 | 1/2000 | Slotznick ................................. | 345/115 |

*Primary Examiner*—Zarni Maung
*Assistant Examiner*—Bunjob Jaroenchonwanit
*Attorney, Agent, or Firm*—Sughrue, Mion, Zinn, Macpeak & Seas, PLLC

[57] ABSTRACT

When text data is transmitted from one computer to a counterpart computer, the counterpart computer displays the text data from the one computer and further displays a plurality of corresponding response buttons. By designating one of the response buttons in the counterpart computer, corresponding response data is transmitted to the one computer. This facilitates a real-time electronic dialog between the computers.

10 Claims, 6 Drawing Sheets

METHOD OF ELECTRONIC DIALOG BETWEEN COMPUTERS, COMPUTER FOR ELECTRONIC DIALOG WITH COUNTERPART COMPUTER, AND STORAGE MEDIUM STORING ELECTRONIC DIALOG PROGRAM EXECUTABLE BY COMPUTER

BACKGROUND OF THE INVENTION

The present invention relates to a method of an electronic interaction or dialog for transmitting mutual intention in real time between two computers connected to each other via a communication network and each having an operating system with a window display function for displaying graphics and characters on a display screen, and further relates to a computer for carrying out such a method and a storage medium storing a program corresponding to such a method and executable by the computer.

In recent years, following the development and spread of the computers, there have been increasing opportunities for users unfamiliar with operations of the computers to transmit their intention or information to each other in real time via the communication network. However, for the real-time transmission of the intention or information in the conventional computer communication, text data for intention/information transmission is directly inputted in a chat format from an on-line terminal.

According to the foregoing conventional text data input technique, it is almost impossible for a user, unfamiliar with an input operation using a keyboard, to input the text data in real time. Thus, there has been a problem that the intention or information can not be transmitted as expected.

SUMMARY OF THE INVENTION

It is therefore an object of the present invention to provide an improved electronic dialog method between a supporting-side and a supported-side computers, wherein it unnecessary for a user of the supported-side computer to input text data in real time from a keyboard in an electronic dialog between the computers.

It is another object of the present invention to provide a computer for carrying out the foregoing improved electronic dialog method.

It is another object of the present invention to provide a storage medium storing a program representing the foregoing improved electronic dialog method and executable by the computer.

Other objects of the present invention will become clear as the description proceeds.

According to one aspect of the present invention, there is provided a method of an electronic dialog between two computers for transmitting mutual intention in real time, said computers being connected to each other via a communication network and each having an operating system with a window display function for displaying graphics and characters on a display screen, one of said computers working as a supporting-side computer, another of said computers working as a supported-side computer, said method comprising the steps of inputting, in said supporting-side computer, text data being a document for intention/information transmission and transmitting said text data to said supported-side computer, displaying, in said supported-side computer, said text data and a plurality of response buttons to be selected for responding to said text data, designating, in said supported-side computer, one of said response buttons and transmitting response data to said text data, corresponding to said one of the response buttons, to said supporting-side computer, and displaying, in said supporting-side computer, said text data and said response data.

According to another aspect of the present invention, there is provided an electronic dialog computer having an operating system with a window display function for displaying graphics and characters on a display screen and carrying out a real-time dialog relative to a counterpart computer connected thereto via a communication network, the electronic dialog computer comprising an input reception/script grammar check section which is operated when the electronic dialog computer works as a supporting-side computer, for checking validity of text data being a document for intention/information transmission to be transmitted to the counterpart computer working as a supported-side computer, a selection result notifying section which is operated when the electronic dialog computer works as the supporting-side computer, for checking validity of response data received from the supported-side computer, a script analyzing section which is operated when the electronic dialog computer works as a supported-side computer, for checking validity of the text data received from the counterpart computer working a supporting-side computer, a button selection result return section which is operated when the electronic dialog computer works as the supported-side computer, for outputting as the response data the contents corresponding to designated one of a plurality of response buttons displayed on the display screen, a transmitting/receiving section for transmitting and receiving the text data and the response data relative to the counterpart computer, and an input/display control section for displaying the text data and the response data on the display screen and, when the electronic dialog computer works as the supported-side computer, displaying the plurality of response buttons on the display screen.

According to still another aspect of the present invention, there is provided a storage medium for use in an electronic dialog between two computers which is for transmitting mutual intention in real time, said computers being connected to each other via a communication network and each having an operating system with a window display function for displaying graphics and characters on a display screen, one of said computers working as a supporting-side computer, another of said computers working as a supported-side computer, said storage medium storing a program which is executable by said computers, said program allowing said computers to execute the steps of inputting, in said supporting-side computer, text data being a document for intention/information transmission and transmitting said text data to said supported-side computer, displaying, in said supported-side computer, said text data and a plurality of response buttons to be selected for responding to said text data, designating, in said supported-side computer, one of said response buttons and transmitting response data to said text data, corresponding to said one of the response buttons, to said supporting-side computer, and displaying, in said supporting-side computer, said text data and said response data.

According to yet another aspect of the present invention, there is provided a storage medium for use in an electronic dialog between a supporting-side computer and a supported-side computer, said storage medium storing a program which is executable by said computers, said program allowing said computers to execute the steps of, in said supporting-side computer, as a first step, inputting text data to be transmitted to said supported-side computer, as a second step, checking whether or not the text data inputted at said first step exceeds a capacity of an input holding buffer of said supporting-side computer and further checking validity of said text data, as a third step, displaying said text data on a display screen of said supporting-side computer when said text data is judged to be OK a said second step, as a fourth step, transmitting said text data displayed at said third step to said supported-side computer, in said supported-side computer, as a fifth step, receiving said text data transmitted from said supporting-side computer, as a sixth step, checking validity of said text data received at said fifth step, as a seventh step, displaying on a display screen of said supported-side computer said text data and a plurality of response buttons to be selected for responding to said text data when said text data is judged to be acceptable at said sixth step, in said supported-side computer, as an eighth step, designating one of said response buttons, as a ninth step, displaying on the display screen response data corresponding to said one of said response buttons designated at said eighth step, as a tenth step, transmitting the response data displayed on the display screen at said ninth step to said supporting-side computer, and in said supporting-side computer, as an eleventh step, receiving said response data transmitted from said supported-side computer, as a twelfth step, checking validity of said response data received at said eleventh step, and, as a thirteenth step, displaying said response data along with said text data on the display screen when said response data is judged to be acceptable at said twelfth step.

DESCRIPTION OF THE PREFERRED EMBODIMENT

Now, a preferred embodiment of the present invention will be described hereinbelow with reference to the accompanying drawings.

Figure 1:
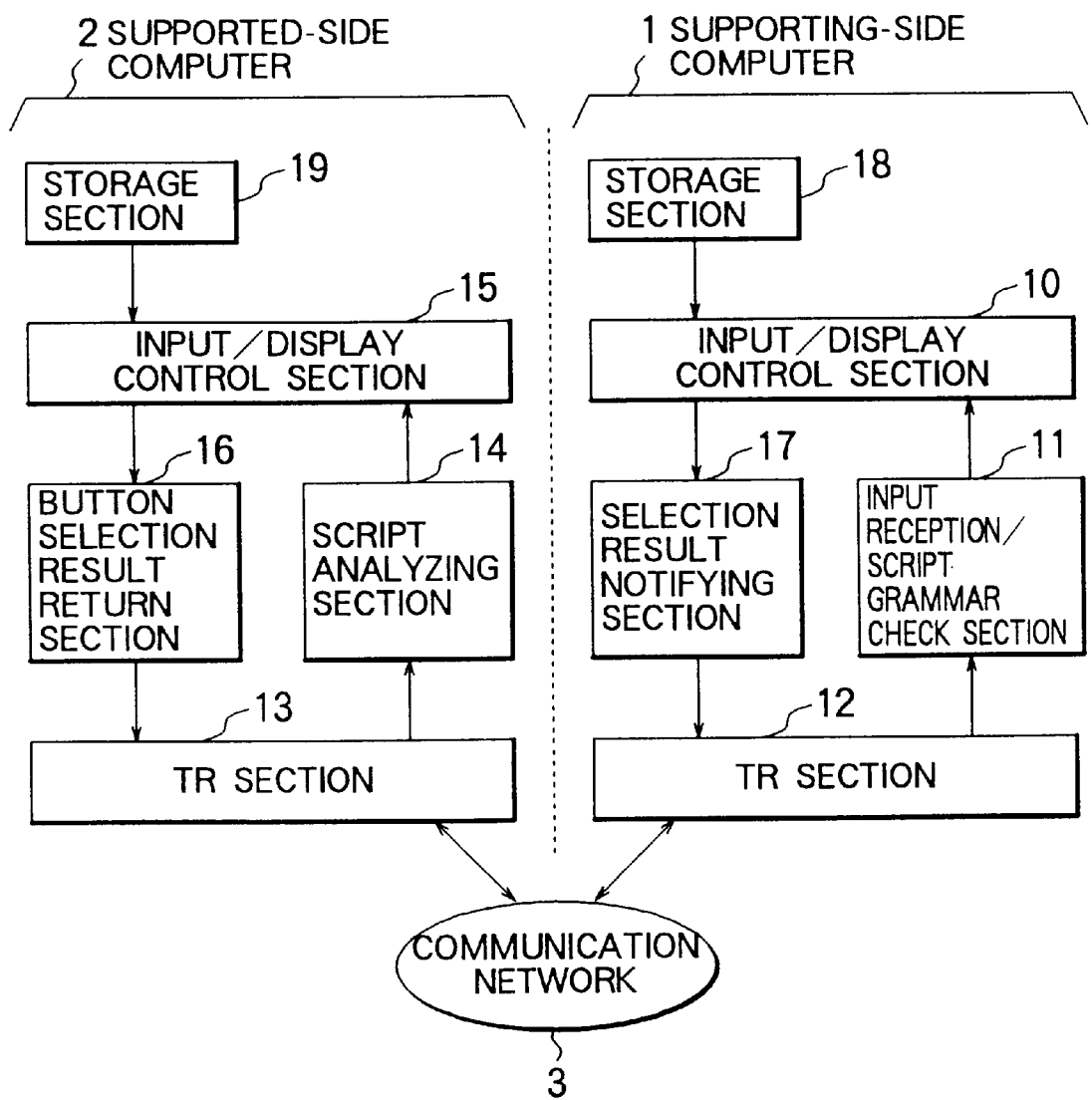
FIG. 1 is a block diagram showing structures of a supporting-side computer and a supported-side computer according to a preferred embodiment of the present invention.

Referring to FIG. 1, description will be made as regards an embodiment of the present invention. Two computers are connected to each other via a communication network 3. One of the computers is used as a supporting-side computer 1, and the other is used as a supported-side computer 2. The supporting-side computer 1 and the supported-side computer 2 have transmitting/receiving sections 12 and 13, respectively, for carrying out transmission and reception of text data and response data (generically referred to as "script") relative to the counterpart computer via the communication network 3, and input/display control sections 10 and 15, respectively, for controlling display of the scripts on display screens.

The supporting-side computer 1 further comprises an input reception/script grammar check section 11 for checking whether or not text data inputted by a user using a keyboard and displayed on the display screen exceeds the capacity of an input holding buffer and further checking the adequacy or validity of the text data, and a selection result notifying section 17 for converting response data sent from the supported-side computer 2 and received at the transmitting/receiving section 12 into a script to be displayed on the display screen.

On the other hand, the supported-side computer 2 further comprises a script analyzing section 14 for analyzing the text data sent from the supporting-side computer 1 and received at the transmitting/receiving section 13 so as to check its adequacy or validity, and a button selection result return section 16 for feeding to the transmitting/receiving section 13 response data having the contents corresponding to a button selected or designated from among response buttons displayed on the display screen.

The supporting-side computer 1 and the supported-side computer 2 have storage sections 18 and 19, respectively, wherein programs are stored for carrying out later-described operations. The supporting-side computer 1 and the supported-side computer 2 are operated according to the programs stored in the storage sections 18 and 19, respectively. The programs are stored into the storage sections 18 and 19 from storage medium storing the programs, respectively.

Figure 2:
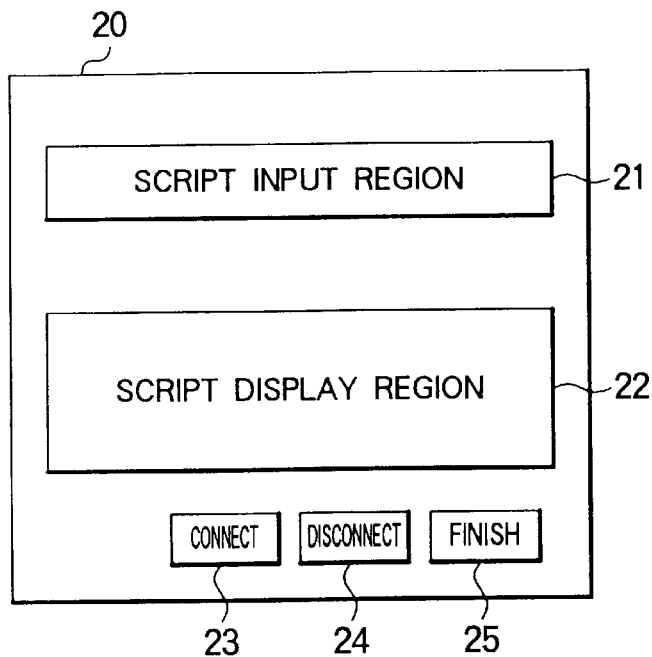
FIG. 2 is a front view showing a window display screen of the supporting-side computer shown in FIG. 1.

Referring to FIG. 2, the description will be made as regards a display screen of the supporting-side computer 1. The display screen will be called hereinafter a window display screen 20 and is realized by an operating system having a window display function. The window display screen 20 displays a script input region 21 for displaying text data inputted by the user through the keyboard, a script display region 22 for displaying the text data displayed on the script input region 21 and transmitted to the supported-side computer 2 via the transmitting/receiving section 12 and response side data transmitted from the supported-side computer 2, a connect button 23 for connection to the supported-side computer 2 via the communication network 3, a disconnect button 24 for disconnection from the supported-side computer 2, and a finish button 25 for notifying the finish of communication.

Figure 3:
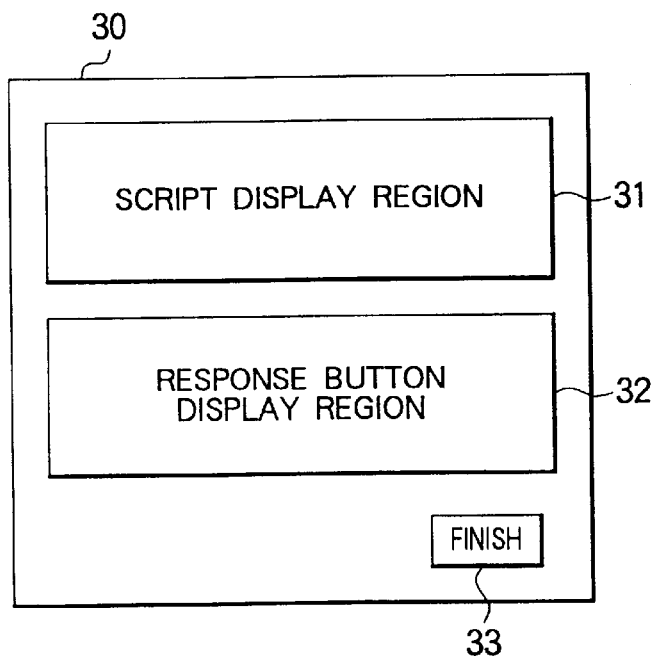
FIG. 3 is a front view showing a window display screen of the supported-side computer shown in FIG. 1.

Referring to FIG. 3, the description will be made as regards a display screen of the supported-side computer 2. The display screen will be called hereinafter a window display screen 30 and displays a script display region 31 for displaying the text data sent from the supporting-side computer 1 and the response data transmitted to the supporting-side computer 1, a response button display region 32 for displaying the plurality of response buttons to be designated (depressed) for transmitting the response data to the supporting-side computer 1, and a finish button 33 for notifying the finish of communication.

Figure 4:
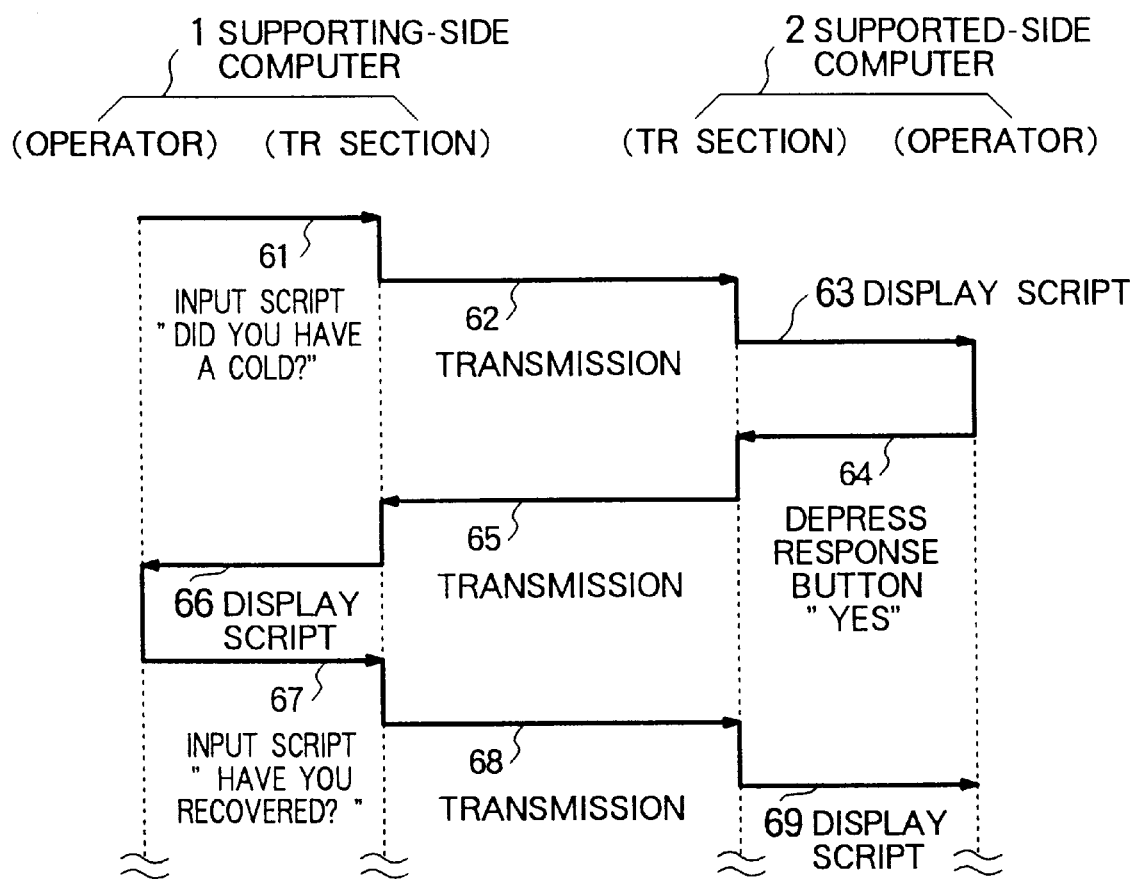
FIG. 4 is a sequence diagram showing an operation sequence of an electronic dialog between the computers illustrated i FIG. 1.

Referring now to FIG. 4 together with FIGS. 1–3. The description will be made as a method of communication or electronic dialog between the two computers 1 and 2.

An operator of the supporting-side computer 1 inputs through the keyboard text data (for example, "Did you have a cold?") to be sent to the supported-side computer 2 (script input 61), and transmits it from the transmitting/receiving section 12 of the supporting-side computer 1 to the transmitting/receiving section 13 of the supported-side computer 2 (transmission 62). In response to receipt of the text data, the supported-side computer 2 displays it on the script display region 31 of the window display screen 30 and simultaneously displays the plurality of response buttons (for example, "Yes" and "No") to be designated (depressed) for transmitting response data to the text data on the response button display region 32 (script display 63). Then, an operator of the supported-side computer 2 selects one of the response buttons (for example, "Yes") on the response button display region 32 and depresses it (response button depression 64). Through this operation, response data having the contents corresponding to the selected response button is transmitted from the transmitting/receiving section 13 of the supported-side computer 2 to the transmitting/receiving section 12 of the supporting-side computer 1 (transmission 65). In response to receipt of the response data from the supported-side computer 2, the supporting-side computer 1 displays it on the script display region 22 of the window display screen 20 (script display 66). Through the foregoing procedure, the electronic dialog is finished in outline. On the other hand, if a further electronic dialing is wished, the operator of the supporting-side computer 1 inputs through the keyboard text data (for example, "Have you recovered?") to be sent next (script input 67) and transmits it from the transmitting/receiving section 12 of the supporting-side computer 1 to the transmitting/receiving section 13 of the supported-side computer 2 (transmission 68). In response to receipt of this text data, the supported-side computer 2 displays it on the script display region 31 of the window display screen 30 and simultaneously displays response buttons on the response button display region 32 (script display 69). Then, the foregoing operations will be repeated. In this fashion, the operator of the supported-side computer 2 can carry out the electronic dialog without unfamiliar keyboard operations.

Figure 5:
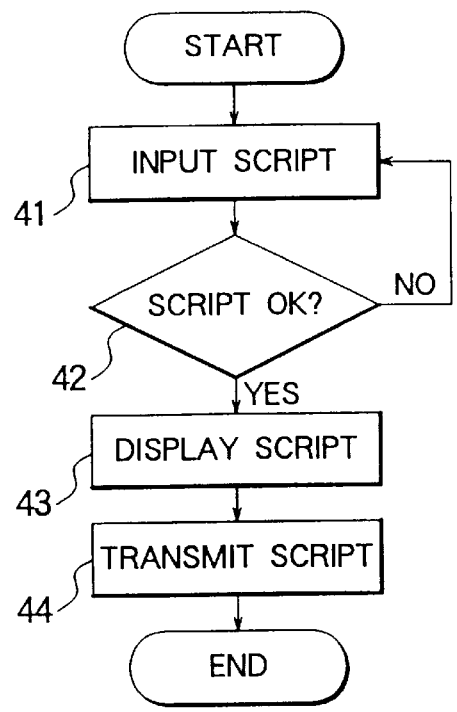
FIG. 5 is a flowchart showing a transmission operation of the supporting-side computer shown in FIG. 1.

Turning to FIG. 5, the description will be directed to an operation procedure of script input 61 and transmission 62. Specifically, when the operator of the supporting-side computer 1 inputs through the keyboard text data to be sent to the supported-side computer 2, the text data is displayed on the script input region 21 of the window display screen 20 (step 41). Then, the input reception/script grammar check section 11 checks whether or not the text data displayed on the script input region 21 exceeds the capacity of the input holding buffer and further checks the adequacy or validity of the text data (step 42). If a result of the check is acceptable, the text data is displayed on the script display region 22 (step 43) and transmitted from the transmitting/receiving section 12 of the supporting-side computer 1 to the transmitting/receiving section 13 of the supported-side computer 2 (step 44). On the other hand, if the result of the check at step 42 is not OK, the text data is corrected until it becomes OK.

Figure 6:
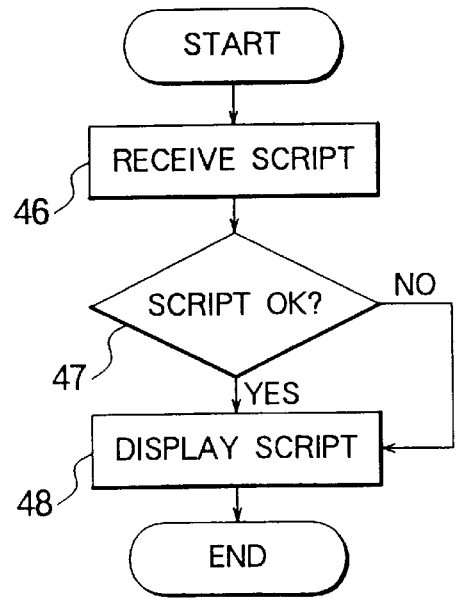
FIG. 6 is a flowchart showing a reception operation of the supported-side computer shown in FIG. 1.

Turning to FIG. 6, the description will be directed to an operation procedure of script display 63. Specifically, in response to receipt of the text data (step 46), the supported-side computer 2 analyzes the text data at the script analyzing section 14 to check its adequacy or validity (step 47). If a result of the check is acceptable, the text data is displayed on the script display region 31 of the window display screen 30, and simultaneously, the plurality of response buttons to be depressed for transmitting response data to the text data are displayed on the response button display region 32 (step 48). On the other hand, if the result of the check at step 47 is not acceptable, the operation is finished.

Figure 7:
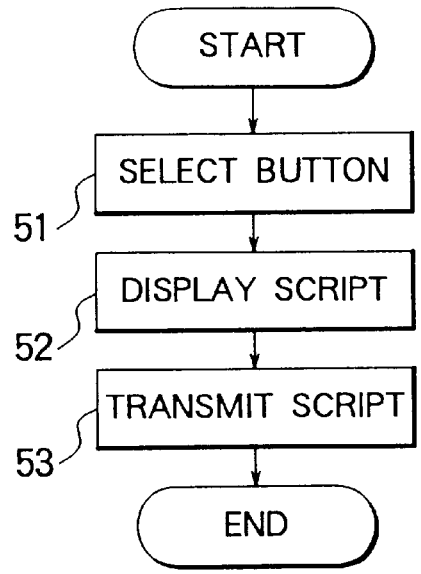
FIG. 7 is a flowchart showing a transmission operation of the supported-side computer shown in FIG. 1.

Turning to FIG. 7, the description will be directed to an operation procedure of response button depression 64 and transmission 65. Specifically, the operator of the supported-side computer 2 watches the text data displayed on the script display region 31 and thinks about a response thereto, and then selects one, corresponding to the response, of the response buttons displayed on the response button display region 32 and depresses it (step 51). Through this operation, response data representing the contents of the selected response button is displayed on the script display region 31 (step 52 and transmitted from the transmitting/receiving section 13 of the supported-side computer 2 to the transmitting/receiving section 12 of the supporting-side computer 1 (step 53).

Figure 8:
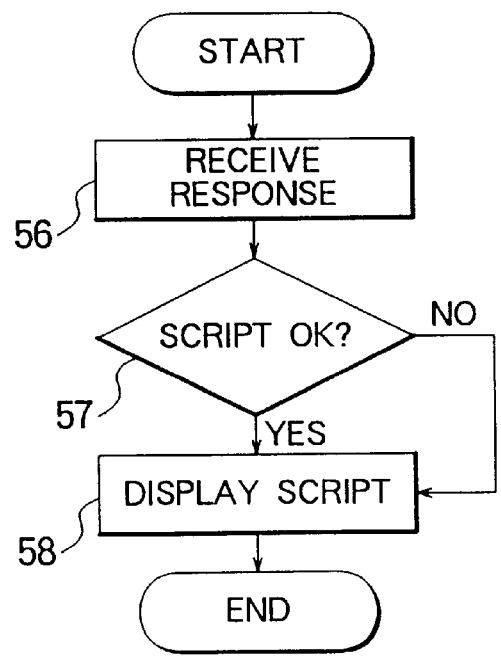
FIG. 8 is a flowchart showing a reception operation of the supporting-side computer shown in FIG. 1.

Turning to FIG. 8, the description will be directed to an operation procedure of script display 66. Specifically, in response to receipt of the response data from the supported-side computer 2 (step 56), the supporting-side computer 1 checks the adequacy or validity of the response data at the selection result notifying section 17 (step 57). If a result of the check is acceptable, the response data is displayed on the script display region 22 of the window display screen 20 (step 58). On the other hand, if the result of the check at strep 57 is not acceptable, the operation is finished.

Figure 9:
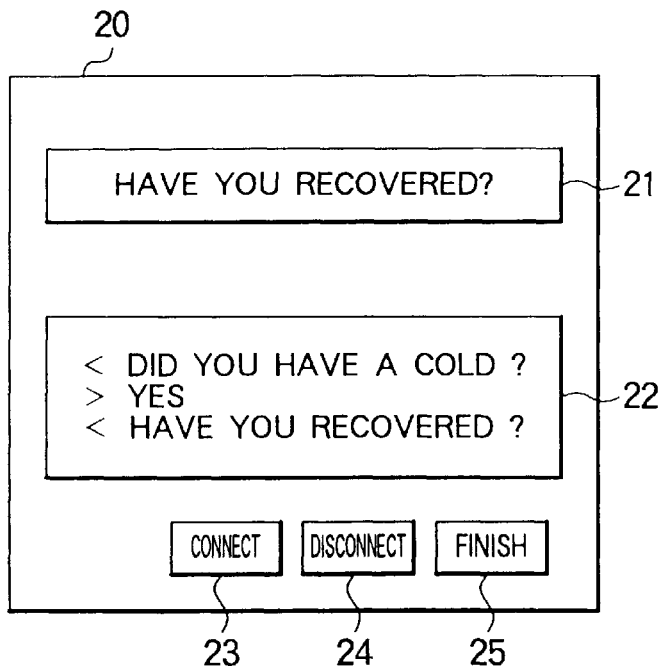
FIG. 9 is a front view showing the display state of the window display screen of the supporting-side computer shown in FIG. 2.
Figure 10:
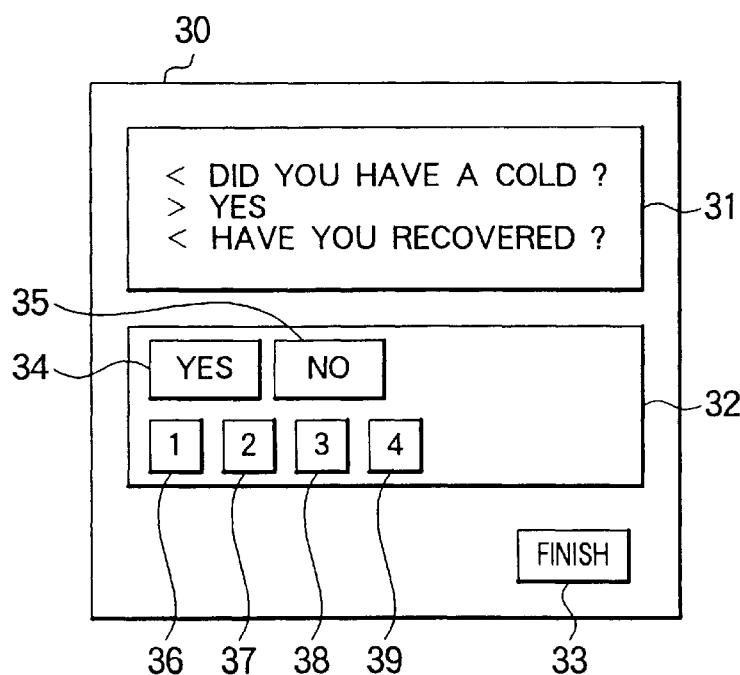
FIG. 10 is a front view showing the display state of the window display screen of the supported-side computer shown in FIG. 3.

Referring now to FIGS. 9 and 10, the description will be directed to concrete examples of the electronic dialog.

When the operator of the supporting-side computer 1 inputs, through the keyboard, text data "Did you have a cold?" and transmits it to the supported-side computer 2, the text data "Did you have a cold?" is displayed on the script display region 22 of the window display screen 20. On the other hand, in response to receipt of the text data, the supported-side computer 2 displays it on the script display region 31 of the window display screen 30 and simultaneously displays two response buttons 34 and 35 of "Yes" and "No" on the response button display region 32 for transmitting response data to the text data. If the operator of the supported-side computer 2 selects "Yes" as a response to the text data "Did you have a cold?" and depresses the response button 34, "Yes" as response data is additionally displayed on the second line of the script display region 31 and transmitted to the supporting-side computer 1. In response to receipt of the response data, the supporting-side computer 1 additionally displays "Yes" on the second line of the script display region 22. Then, if the operator of the supporting-side computer 1 inputs text data "Have you recovered?" and transmits it to the supported-side computer 2, the text data "Have you recovered?" is additionally displayed on the script display region 22 of the window display screen 20 of the supporting-side computer 1. In response to receipt of the text data, the supported-side computer 2 additionally displays the text data "Have you recovered?" on the script display region 31 of the window display screen 30. FIGS. 9 and 10 show the states at this time. In FIG. 10, response buttons 36 to 39 displayed on the response button display region 32 as "1" to "4" are used when there are four alternative answers rather than two alternative answers of "Yes" and "No" relative to inputted text data, and displayed along with the response buttons 34 and 35 as an example.

As described above, when text data is transmitted from one computer to a counterpart computer, the counterpart computer displays the text data from the one computer and further displays a plurality of corresponding response buttons. By designating one of the response buttons in the counterpart computer, corresponding response data is transmitted to the one computer. This makes it possible to carry out a real-time electronic dialog relative to a computer operated even by an operator unfamiliar with keyboard manipulation. Thus, the electronic dialog between the computers can be performed easily and widely.

While the present invention has been described in terms of the preferred embodiment, the invention is not to be limited thereto, but can be embodied in various ways without departing from the principle of the invention as defined in the appended claims.

What is claimed is:

1. A method of an electronic dialog between two computers for transmitting mutual intention in real time, said computers being connected to each other via a communication network and each having an operating system with a window display function for displaying graphics and characters on a display screen, one of said computers working as a supporting-side computer, another of said computers working as a supported-side computer, said method comprising the steps of:

inputting, in said supporting-side computer, text data being a document for intention/information transmission, and transmitting said text data to said supported-side computer;

simultaneously displaying, in said supported-side computer, said text data in a script display region and a plurality of response buttons in a response button display region, said response buttons corresponding to response data, and said response buttons to be selected for responding to said text data;

designating, in said supported-side computer, one of said response buttons and transmitting said response data to said text data, to the supporting-side computer; and displaying, in said supporting-side computer, said text data and said response data.

2. A method as claimed in claim 1, wherein the inputting and transmitting step comprises the steps of:

inputting said text data in said supporting-side computer;

checking whether or not said text data exceeds a capacity of an input holding buffer of said supporting-side computer and further checking validity of said text data;

displaying said text data on said display screen of the supporting-side computer when said text data is judged to be OK at the checking step; and transmitting said text data displayed at the last-mentioned displaying step to said supported-side computer.

3. A method as claimed in claim 1, wherein the first-mentioned displaying step comprises the steps of:

receiving said text data transmitted from said supporting-side computer;

checking validity of said text data received at the receiving step; and displaying on said display screen of the supported-side computer said text data and said response buttons when said text data is judged to be OK at the checking step.

4. A method as claimed in claim 1, wherein the designating and transmitting step comprises the steps of:

designating said one of the response buttons;

displaying on the display screen the response data corresponding to said one of the response buttons designated at the last-mentioned designating step; and transmitting said response data displayed on said display screen of the supporting-side computer at the last-mentioned displaying step to said supporting-side computer.

5. A method as claimed in claim 1, wherein the displaying step comprises the steps of:

receiving said response data transmitted from said supported-side computer;

checking validity of said response data received at the receiving step; and displaying said response data along with said text data on the display screen when said response data is judged to be OK at the checking step.

6. A method as claimed in claim 1, wherein said response buttons corresponding to response data are input into said supporting-side computer and are transmitted with said text data to said supported-side computer for display in said response button display region of said supported-side computer.

7. A method as claimed in claim 1, wherein said response buttons corresponding to response data are generated in a processing function prior to display in said response button display region of said supported-side computer.

8. An electronic dialog computer having an operating system with a window display function for displaying graphics and characters on a display screen and carrying out a real-time dialog relative to a counterpart computer connected thereto via a communication network, said electronic dialog computer comprising:

an input reception/script grammar check section which is operated when said electronic dialog computer works as a supporting-side computer, for checking validity of text data being a document for intention/information transmission to be transmitted to said counterpart computer working as a supported-side computer;

a selection result notifying section which is operated when said electronic dialog computer works as the supporting-side computer, for checking validity of response data received from said supported-side computer;

a script analyzing section which is operated when said electronic dialog computer works as a supported-side computer, for checking validity of the text data received from the counterpart computer working a supporting-side computer;

a button selection result return section which is operated when said electronic dialog computer works as the supported-side computer, for outputting as said response data the contents corresponding to designated one of a plurality of response buttons displayed on the display screen;

a transmitting/receiving section for transmitting and receiving said text data and said response data relative to said counterpart computer; and an input/display control section for displaying said text data and said response data on the display screen and, when said electronic dialog computer works as the supported-side computer, simultaneously displaying on the display screen said text data in a script display region and said plurality of response buttons in a response button display region, said response buttons corresponding to response data.

9. A storage medium for use in an electronic dialog between two computers which is for transmitting mutual intention in real time, said computers being connected to each other via a communication network, and each having an operating system with a window display function for displaying graphics and characters on a display screen, one of said computers working as a supporting-side computer, another of said computers working as a supported-side computer, said storage medium storing a program which is executable by said computers, said program allowing said computers to execute the steps of:

inputting, in said supporting-side computer, text data being a document for intention/information transmission and transmitting said text data to said supported-side computer;

simultaneously displaying, in said supported-side computer, said text data in a script display region and a plurality of response buttons in a response button display region, said response buttons corresponding to response data, and said response buttons to be selected for responding to said text data;

designating, in said supported-side computer, one of said response buttons and transmitting said response data to said text data, to the supporting-side computer; and displaying, in said supporting-side computer, said text data and said response data.

10. A storage medium for use in an electronic dialog between a supporting-side computer and a supported-side computer, said storage medium storing a program which is executable by said computers, said program allowing said computers to execute the steps of:

In said supporting-side computer, as a first step, inputting text data to be transmitted to said supported-side computer, as a second step, checking whether or not the text data inputted at said first step exceeds a capacity of an input holding buffer of said supporting-side computer and further checking validity of said text data, as a third step, displaying said text data on a display screen of said supporting-side computer when said text data is judged to be acceptable at said second step, as a fourth step, transmitting said text data displayed at said third step to said supported-side computer;

in said supported-side computer, as a fifth step, receiving said text data transmitted from said supporting-side computer, as a sixth step, checking validity of said text data received at said fifth step, as a seventh step, simultaneously displaying on a display screen of said supported-side computer said text data in a script display region and a plurality of response buttons in a response button display region, said response buttons corresponding to response data, and said response buttons to be selected for responding to said text data when said text data is judged to be acceptable at said sixth step;

in said supported-side computer, as an eighth step, designating one of said response buttons, as a ninth step, displaying on the display screen response data corresponding to said one of said response buttons designated at said eighth step, as a tenth step, transmitting the response data displayed on the display screen at said ninth step to said supporting-side computer; and in said supporting-side computer, as an eleventh step, receiving said response data transmitted form said supported-side computer, as a twelfth step, checking validity of said response data received at said eleventh step, and, as a thirteenth step, displaying said response data along with said text data on the display screen when said response data is judged to be acceptable at said twelfth step.

\* \* \* \* \*